United States Patent [19]
Howell

[11] 3,887,093
[45] June 3, 1975

[54] BOAT TRAILER
[76] Inventor: Gerald D. Howell, 802 Harrison Rd., Longview, Tex. 75601
[22] Filed: June 1, 1972
[21] Appl. No.: 258,775

[52] U.S. Cl. .................. 214/84; 9/1 TR; 240/8.3; 280/414 R; 280/144
[51] Int. Cl. .............................................. B60p 1/52
[58] Field of Search .......... 214/84; 280/144, 414 R; 9/1 TR; 240/8.3

[56] References Cited
UNITED STATES PATENTS

| | | | |
|---|---|---|---|
| 3,021,969 | 2/1962 | Peake et al. | 214/84 |
| 3,056,517 | 10/1962 | Trumbull | 214/84 |
| 3,160,297 | 12/1964 | Stumvoll | 214/84 |
| 3,447,815 | 6/1969 | West | 280/144 |
| 3,603,465 | 9/1971 | King | 214/84 |
| 3,717,268 | 2/1973 | Snodgrass | 214/84 X |

FOREIGN PATENTS OR APPLICATIONS

| | | | |
|---|---|---|---|
| 1,806,228 | 5/1970 | Germany | 240/8.3 |

Primary Examiner—Leo Friaglia
Attorney, Agent, or Firm—Larson, Taylor and Hinds

[57] ABSTRACT

A boat trailer comprising a trailer frame mounted on wheels, a pair of L-shaped guide members located laterally one on each side of said trailer frame near its loading end with the horizontal portions of the L-shaped members traversing the respective sides of the trailer frame, an interconnecting member the horizontal portion of each of said L-shaped members being adjustably connected to said interconnecting member to provide lateral movement of said L-shaped members relative to said frame, means for mounting each of said L-shaped members to said frame so as to permit said lateral movement, said vertical portion of each of said L-shaped members being provided with a rotatable tube of resilient material.

7 Claims, 6 Drawing Figures

BOAT TRAILER

This invention relates to boats and boat trailers. More particularly, the invention is directed to boat trailers provided with guide members for facilitating the reloading of boats from the water onto the trailer.

Wind and rough water frequently make it very difficult to load a boat from the water onto a trailer without the aid of guides placed near the back or loading end of the trailer. The prior art describes a number of such guide members all of which are not without their shortcomings. A major complaint against many prior art guide members is that they are severely limited as to the number of combinations of boats and boat trailers with which they can be used. Another common complaint rendered against present guide members is that either they cannot be installed with the ease and facility demanded by boat dealers or owners or are difficult to remove once installed. Other guide members are inclined to be too bulky, of complex construction and frequently quite expensive. Yet other prior art guide members have been criticized for their inability to carry out their function without scuffing or scratching the boat during the loading operation.

Lastly, most boaters disconnect the trailer lights before backing the trailer into the water; otherwise they run the danger of burning out the lights since they will be under water when the trailer is in position to receive the boat. Guide members currently in use do nothing to alleviate this condition.

One object of this invention therefore is to provide a boat trailer with guide members visible above the water to enable the boater to make a correct approach to the trailer.

Another object of the invention is to provide guide members of simple construction which can be easily installed on any trailer and adjusted to fit any combination of boat and trailer.

Yet another object of the invention is to provide guide members which are easily removed when the owner desires to trade his boat for a new rig and reinstall the guide member.

A further object of the invention is to provide guide members which not only alleviate scuffing or scratching of the boat during the loading operation but also assist in the loading.

Another object of the invention is to provide guide members on which trailer lights can be mounted at a height that ensures they will not be under water.

These and other objects of the invention are obtained by a boat trailer comprising a trailer frame mounted on wheels, a pair of L-shaped guide members located laterally on each side of said trailer frame near its loading end with the horizontal portions of the L-shaped members traversing the respective sides of the trailer frame, an inner connecting member, the horizontal portion of each of said L-shaped members being adjustably connected to said inter-connecting member to provide lateral movement of said L-shaped members relative to said frame, means for mounting each of L-shaped members to said frame so as to permit said lateral movement, said vertical portion of each of said L-shaped members being provided with a rotatable tube of resilient material.

In preferred embodiments the horizontal portions of the L-shaped members are in telescoping engagement with the inter connecting member and include a tail light bracket means.

The following is a detailed description of a preferred embodiment of the present invention to be read with the accompanying drawings. However, it is to be understood that the detailed description and drawings are provided for purposes of illustrating the preferred embodiment and that the invention is capable of numerous modifications and variations apparent to those skilled in the art without departing from the spirit and scope of the invention.

Figure 1:
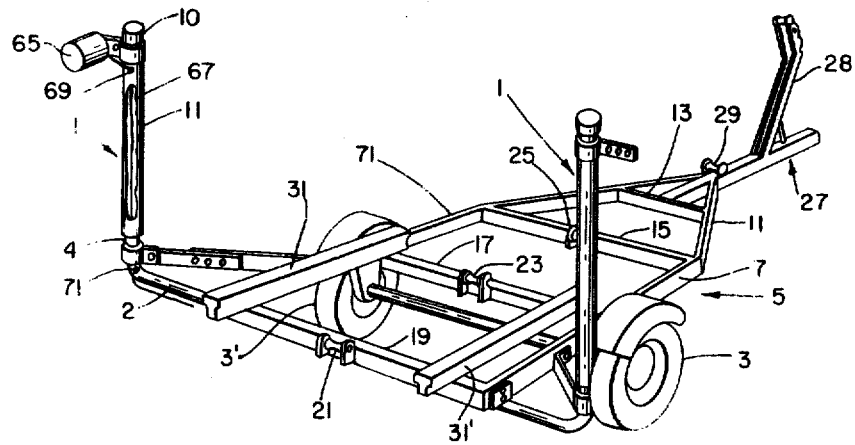
FIG. 1 is a perspective view of a boat trailer showing the guide members mounted on it.
Figure 2:
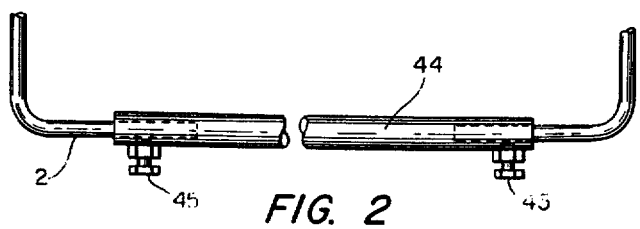
FIG. 2 is a partial perspective view of the L-shaped members connected to the inter-connecting member.
Figure 3:
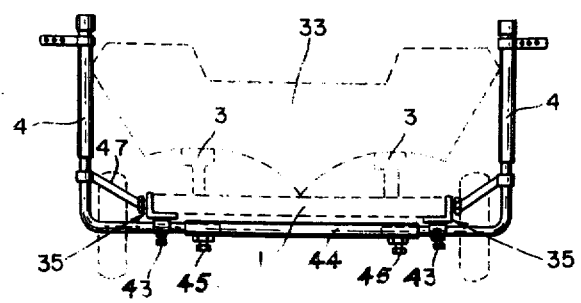
FIG. 3 is a rear elevation view of a boat and tire in phantom lines and the guide members mounted and adjusted to the correct position.

Referring to the drawings FIG. 1 shows guide members indicated generally as 1 attached to a boat trailer. A boat trailer is mounted on wheels 3 and 3' and comprises a trailer frame indicated generally as 5 composed of side rails 7 and 7' and rail 19 at its loading end, and opposite triangular end portion 11, and crossed rails 13, 15 and 17. End rail 19 and cross rails 17 and 15 are provided with rollers 21, 23 and 25, respectively. Integral with the triangular end portion 11 of the trailer frame 5 is a tongue element 27 which harbors a winch 28 and a roller 29. Bolster elements 31 and 31' are disposed across the trailer frame in parallel with each other.

The L-shaped guide members 1 may be of any desired geometric shape but are preferably cylindrical. They are composed of a horizontal portion 2 and a vertical portion 4. The vertical portion 4 is fitted with a cap 10 and encased with a loosely fitting, rotatable tube 11 of resilient material such as rubber or resilient plastic, which tube 11 acts as a roller during loading of the boat. The tube 11 thus serves to curtail scuffing or scratching of the boat surface during the loading operation and helps in the actual loading itself.

Figure 4:
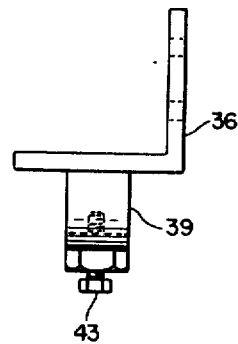
FIG. 4 is a front perspective view of the main bracket for fixing the guide members to the trailer frame.
Figure 5:
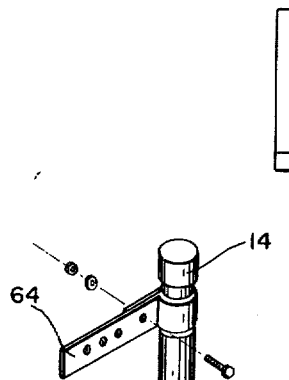
FIG. 5 is a side view of the main bracket of FIG. 4.

Referring to FIGS. 2–6 each of the horizontal portions 2 of the L-shaped guide members pass beneath the trailer frame 5 in a substantially parallel direction to the rear or loading end rail 19 and are fastened to each side 7, 7' by fastening means indicated generally as 35. Referring to FIGS. 4 and 5, it is seen that the fastening means 35 comprises a main bracket 36 and a U-clamp 39 integral with the base of main bracket 36. The bracket 36 is bolted to the side rails 7 and 7' by a means of bolts 40, washers 41 and nuts 42 so that the U-clamp 39 extends below the side rails 7 and 7'. The U-clamp 39 contains a screw nut 43. Horizontal portions 2 of the L-shaped guide members 1 are inserted through U-clamp 39 of the fastening means 35 and inter-connected by an inter-connecting tube 44. As seen more clearly in FIG. 3 the internal diameter of the inter-connecting tube 44 is slightly larger than the diameter of the horizontal portions 2 of L-shaped guide members 1 so that the latter are in telescoping engagement with the inter-connecting tube 44. The interconnecting tube 44 contains a set screw 45 near each end for securing the L-shaped member in the desired position.

Figure 6:
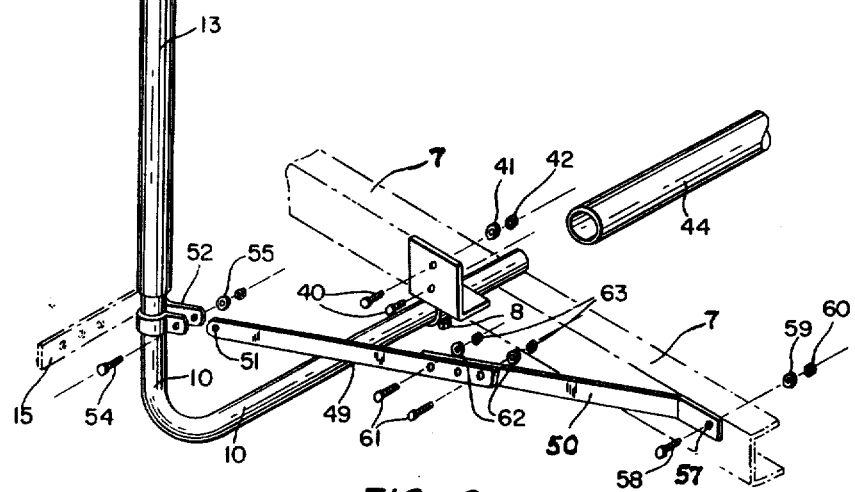
FIG. 6 is an exploded view of one guide member and inter-connecting tube.

A brace element, indicated generally as 47, is installed between side rails 7 and 7' and the respective vertical portions 4 of the L-shaped guide members. Referring to FIG. 6 the brace is composed of two pieces, a piece 49 and a piece 50. Piece 49 has a hole 51 by which it is attached to the vertical portion 4 of the guide member by means of a clamp 52, bolt 54, washer 55 and nut 56. Piece 50 has a hole 57 and one end through which it is attached to the side rail 7 or 7' by means of bolt 58, washer 59 and nut 60. The other ends of pieces 49 and 50 contain a series of holes 53 through which the two pieces can be inter-connected by aligning the holes at the appropriate distance and securing the pieces together at that point by means of bolts 61, washers 62 and nuts 63.

Advantageously, a trailer light bracket 64 can be clamped to the guide member either above the rolling tube 11 or below the tube 11 as shown in FIGS. 1 and 6. If the trailer lights shown as 65 in FIG. 1 are mounted in the top position, wiring 67 may be installed to run through the vertical portion 4 of the guide members exiting at the top via hole 69 and at the lower end via hole 71. Should it be desired to mount the light 65 in the lower position, it would not be necessary to have the wiring go inside the guide members. Provision of the lights on the top position is preferred, however, since at that height they will never be under water. Whether the lights are positioned at the top or the bottom position the placement thereof is at the extreme width of the load where clearance lights properly belong. Hence, this feature of the invention avoids the common problem associated with trailer hauling of boats where the clearance lights are correctly mounted on the trailer but the trailer frame is smaller frequently one, two or more feet inside the width of the boat on each side of the trailer.

Installation of the L-shaped guide members may be simply and quickly accomplished for instance by first securing the main brackets 36 onto the respective sides 7 and 7' opposite each other. Then with the boat in loaded position on the trailer frame the horizontal portions 2 of the guide members 1 are inserted through the U-clamps 39 and moved until the resilient tube 11 touches the boat. The set screw 43 on the U-clamp 39 is tightened. Inter-connecting tube 44 is then slid over the end of the horizontal portion of the guide members until it is approximately equidistant from the side rails 7 and 7' and the set screw at this end tightened. The opposite guide member is then inserted through the U-clamp 39 on its side and on into the inter-connecting tube 45 and moved inwardly until its rotating tube 11 touches the boat. Set screw 43 of U-clamp 39 and set screw 45 of the inter-connecting tube 43 to which it has been passed are all then tightened. To complete the installation each support brace 57 is adjusted to the appropriate distance between the side rail 7 and 7' and the horizontal portion of the guide members, fixed to this distance and secured to othe respective side rails and vertical portions of the guide members. It should be noted that this is but one method of effecting installation of the guide members of the present invention and that numerous alternative methods of accomplishing the installation will become evident to those of ordinary skill in this art.

The installed guide members are easily adjustable to fit any size boat by merely removing bolts 58, loosening set screws 43 of the U-clamps 39 and set screws 45 of the inter-connecting tube 43. The guide members may then be moved laterally to accommodate the boat and the set screws 43 and 45 tightened and bolt 58 replaced.

The preferred combination of the invention has been illustrated and described but changes and modifications can be made and some features can be used in different combinations without departing from the spirit of the invention. For instance, a second pair of guide members can be installed toward the front of the trailer to assure correct alignment.

It is claimed:

1. A boat trailer comprising a trailer frame mounted on wheels, a pair of L-shaped cylindrical guide members located one on each side of said trailer frame with the horizontal portions of the L-shaped guide member traversing beneath the respective sides of the trailer frame near its loading end, a tubular interconnecting member, said horizontal portions of the L-shaped member being in telescoping engagement with said interconnecting member to provide lateral movement of the L-shaped guide members relative to said frame, means for mounting the respective L-shaped members to the sides of the trailer frame comprising a bracket provided with means through which the horizontal portion of the L-shaped member slides, an adjustable support member attached at one end to the vertical portion of said L-shaped member and at the other end to the trailer frame, said vertical portion of said L-shaped guide member being provided with a rotatable tube of resilient material.

2. The boat trailer of claim 1 wherein the vertical portions of said L-shaped members include a tail light bracket means.

3. The boat trailer of claim 1 wherein the mounting bracket comprises a main bracket body which is secured to the trailer frame and a looped element integral with and extending below said main bracket body through which said horizontal portion of the L-shaped member slides.

4. The boat trailer of claim 1 wherein means are provided said mounting means for securing said horizontal portion of the L-shaped member.

5. The boat trailer of claim 1 wherein the vertical portion of the L-shaped member is provided with a cap member.

6. The boat trailer of claim 1 wherein the resilient material is of a synthetic plastic.

7. The boat trailer of claim 1 wherein the resilient material is of a synthetic rubber.

* * * * *